United States Patent
Hirano et al.

(10) Patent No.: US 6,908,959 B2
(45) Date of Patent: Jun. 21, 2005

(54) THERMOPLASTIC RESIN COMPOSITION EXCELLENT SLIDING PROPERTIES

(75) Inventors: Hideki Hirano, Sodegaura (JP); Kunihiko Takeuchi, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 26 days.

(21) Appl. No.: 10/088,209

(22) PCT Filed: Jul. 11, 2001

(86) PCT No.: PCT/JP01/06002
§ 371 (c)(1),
(2), (4) Date: Mar. 15, 2002

(87) PCT Pub. No.: WO02/06397
PCT Pub. Date: Jan. 24, 2002

(65) Prior Publication Data
US 2002/0169254 A1 Nov. 14, 2002

(30) Foreign Application Priority Data
Jul. 17, 2000 (JP) ........................ 2000-216332

(51) Int. Cl.⁷ ........................... C08L 51/08; C08L 51/00
(52) U.S. Cl. ........................... 524/490; 524/504
(58) Field of Search ................. 524/490, 504

(56) References Cited

U.S. PATENT DOCUMENTS

| | | | | |
|---|---|---|---|---|
| 4,397,986 A |   | 8/1983 | Hornbaker | |
| 5,290,885 A | * | 3/1994 | Vincent et al. | 525/478 |
| 5,442,000 A | * | 8/1995 | Kato et al. | 524/291 |
| 5,552,465 A |   | 9/1996 | Witmann et al. | |
| 5,942,568 A | * | 8/1999 | Niino et al. | 524/405 |
| 6,221,961 B1 | * | 4/2001 | Hirano et al. | 525/65 |
| 6,777,487 B2 | * | 8/2004 | Niino et al. | 524/593 |

FOREIGN PATENT DOCUMENTS

| | | |
|---|---|---|
| EP | 0322095 A2 | 6/1989 |
| EP | 0388388 A2 | 9/1990 |
| EP | 0599292 A1 | 6/1994 |
| EP | 0787769 A2 | 8/1997 |
| JP | 04055459 A | 2/1992 |
| JP | 11-71439 A | 3/1999 |
| WO | 93/08234 A1 | 4/1993 |
| WO | WO 98/58024 | * 12/1998 |

* cited by examiner

*Primary Examiner*—Jeffrey Mullis
(74) *Attorney, Agent, or Firm*—Birch, Stewart, Kolasch & Birch, LLP

(57) ABSTRACT

The present invention provides a resin composition having low mold contamination, excellent moldability and frictional wear properties, and further having good impact resistance.

The thermoplastic resin composition is a copolymer comprising:

[A] 100 parts by weight of a polyacetal resin or thermoplastic aromatic polyester resin,

[B] 0.1 to 20 parts by weight of a graft polymer in which (B-2) a vinyl (co)polymer component comprising at least one vinyl compound is graft-polymerized on (B-1) an olefin polymer as a backbone polymer, and

[C] 0.1 to 10 parts by weight of a liquid ethylene/α-olefin random copolymer comprising ethylene and an α-olefin having 3 to 20 carbon atoms, which random copolymer has (i) a proportion of a structural unit derived from ethylene of from 20 to 80 mol % and a proportion of a structural unit derived from α-olefin of from 20 to 80 mol % based on all structural units, (ii) a number average molecular weight (Mn) of from 500 to 10000, (iii) a molecular weight distribution (Mn/Mn) determined by a ratio of a weight average molecular weight (Mw) to a number average molecular weight (Mn) of from 1.2 to 3, and (iv) a pour point of lower than 20° C.

8 Claims, No Drawings

THERMOPLASTIC RESIN COMPOSITION EXCELLENT SLIDING PROPERTIES

This application is the national phase under 35 U.S.C. §371 of PCT International Application No. PCT/JP01/06002 which has an International filing date of Jul. 11, 2001, which designated the United States of America.

FIELD OF THE INVENTION

The present invention relates to thermoplastic resin compositions, more particularly relates to resin compositions capable of preparing molded articles of excellent sliding properties and frictional wear properties, and further having good appearance, moldability and mold releasability and having low mold contamination.

BACKGROUND OF THE INVENTION

Polyacetal resins and thermoplastic aromatic polyesters, particularly polybutylene terephthalate resins have been used widely in various industrial fields including automotive, electric and electronic industries, as engineering plastics having excellent mechanical properties and chemical resistance in common use. Particularly, these resins have high frictional wear properties so that they are frequently used for electric and electronic apparatus parts, for example, machinery parts such as gears and cams or sliding part materials for connector and switch parts.

However, with the miniaturization and high performance development of electric and electronic apparatuses, the performance required for machinery parts in use is progressed and the properties that conventional resins possess only have been being insufficient for frictional wear properties.

Conventionally, a method of applying or immersing grease as an improver for sliding properties on molded article surfaces has been employed, but has a problem in that grease oozed on the molded article surfaces makes the surrounding parts dirty and the durability of effecting thereof as an improver for sliding properties is not sufficient.

Separately from this method, there has been a method of adding fluorine resins or a synthetic oil such as silicon oil or olefin polymerized oil as an additive to resin compositions for molding. The use of the compositions improves sliding properties of molded articles. However, it has a problem in that the fluorine resins are generally expensive, and these additives have inferior compatibility with polyacetal resins or thermoplastic aromatic polyester resins, thereby easily causing phase separation, or causing wetting or peeling on the molded article surfaces, and further, the releasability from molds is low at the molding, thereby causing mold contamination.

Therefore, the present applicant proposes in JP-A-11-5912/1999 a resin composition for molding prepared by adding a specific liquid oxidation modified ethylene/α-olefin random copolymer to polyacetal resins, ABS resins or thermoplastic polyester resins. Further, the present applicant proposes in JP-A-5-5912/1999 a resin composition for molding prepared by adding a liquid oxidation modified ethylene/α-olefin random copolymer to polyacetal resins, ABS resins or thermoplastic polyester resins. Furthermore, the present applicant proposes in JP-A-11-71439/1999 a resin composition for molding prepared by adding a graft modified copolymer obtainable by graft polymerization of a carboxylic acid monomer and/or a hydroxy group-containing ethylene unsaturated monomer on an ethylene/α-olefin random copolymer, to polyacetal resins, ABS resins or thermoplastic polyester resins.

The use of the resin composition for molding can lead molded articles having improved sliding properties and further those having low mold contamination, excellent moldability and excellent frictional wear properties. However, the more improvement of mechanical strength such as impact resistance or the like has been desired.

It is an object of the invention to provide resin compositions having low mold contamination, excellent moldability, excellent frictional wear properties, and favorable impact resistance to solve the above problems by improving compatibility between the polyacetal resins or thermoplastic aromatic polyester resins and the liquid ethylene/α-olefin random copolymers used as a lubricating oil.

DISCLOSURE OF THE INVENTION

The thermoplastic resin composition of the present invention is a copolymer comprising:

[A] 100 parts by weight of a polyacetal resin or thermoplastic aromatic polyester resin,

[B] 0.1 to 20 parts by weight of a graft polymer in which (B-2) a vinyl (co)polymer component comprising at least one vinyl compound is graft-polymerized on (B-1) an olefin polymer as a backbone polymer, and

[C] 0.1 to 10 parts by weight of a liquid ethylene/α-olefin random copolymer comprising ethylene and an α-olefin having 3 to 20 carbon atoms, which random copolymer has:

(i) a proportion of a structural unit derived from ethylene of from 20 to 80 mol % and a proportion of a structural unit derived from an α-olefin of from 20 to 80 mol % based on all structural units, (ii) a number average molecular weight (Mn) of from 500 to 10000, (iii) a molecular weight distribution (Mn/Mn) determined by a ratio of a weight average molecular weight (Mw) to a number average molecular weight (Mn) of from 1.2 to 3, and (iv) a pour point of lower than 20° C.

The above graft copolymer [B] is preferably a graft copolymer obtainable by graft copolymerization of at least one monomer selected from the group consisting of vinyl aromatic compounds, vinyl cyanide compounds and (meth) acrylic ester compounds in the presence of a butadiene-containing rubber.

The thermoplastic aromatic polyester resin component is preferably polybutylene terephthalate.

The above liquid ethylene/α-olefin random copolymer component [C] is preferably a liquid ethylene/propylene copolymer.

BEST MODE OF CARRYING OUT THE INVENTION

The resin composition of the present invention will be described in detail in below.

The resin composition of the present invention comprises: [A] the specific thermoplastic resin, [B] the graft copolymer comprising the specific polymer components, and [C] the liquid ethylene/α-olefin random copolymer having a specific molecular weight and composition.

First, the components of the resin composition of the present invention are each described in detail.

Thermoplastic Resin [A]

The thermoplastic resin [A] used for the present invention is selected from polyacetal resins or thermoplastic aromatic polyester resins.

(1) Polyacetal Resins

Polyacetal resins are polymer (polyformaldehyde) obtainable by poly-addition of formaldehyde, or resins obtainable by ring opening polymerization of trioxane (cyclic trimer of formaldehyde) as a raw material in the presence of a cationic catalyst, and having a polyoxymethylene chain as a main skeleton. Examples of the polyacetal resins are homopolymer type one and copolymer type one obtainable by copolymerization of trioxane with ethylene oxide. In the present invention, any type of the homopolymer resins may be used. These polyacetal resins are commercially available, and may be, for example, Duracon™ (available by Polyplastics Co.), Tenac™ (available by Asahi Kasei Co.) or Iupital™ (available by Mitsubishi Engineering-Plastics Co.), which are preferably used in the present invention.

(2) Thermoplastic Aromatic Polyester Resin

The thermoplastic aromatic polyester resin used in the present invention is typically a resin obtainable by polycondensation of aromatic dicarboxylic acids with diol. Examples of the resin used in the invention may include polybutylene terephthalate, polyethylene terephthalate, polyethylene-2,6-naphthalene dicarboxylate and polycyclohexane terephthalate, and particularly, polybutylene terephthalate is preferred.

Polybutylene terephthalate is a thermoplastic aromatic polyester resin obtainable by polycondensation of 1,4-butanediol with terephthalic acid or dimethyl terephthalate.

The polybutylene terephthalate resin is commercially available, and may include, for example, Duranex™ (Polyplastics Co.), Toray PBT™ (Toray C.) and (VALOX™ (Nippon GE Plastics Co.). These can be used preferably in the present invention.

In the invention, these thermoplastic resins may be used singly or in combination with two or more.

Graft Copolymer [B]

The graft copolymer [B] used for the resin composition of the present invention is described.

The graft copolymer [B] used for the resin composition of the invention is a copolymer in which (B-2) a vinyl (co) polymer component comprising at least one vinyl compound is graft-copolymerized on (B-1) the olefin polymer as backbone.

The olefin polymer (B-1) is homo polymer of mono-olefins such as ethylene, propylene, butene-1, pentene-1,4-methylpentene-1, hexene-1, heptene-1 or octene-1; or diene monomers such as butadiene, isoprene, di-cyclopentadiene, ethylidene norbornene or 1,6-hexadiene or copolymer contained units derived from the mono-olefins or dienes as main component. Examples thereof may include polyethylene, polypropylene, ethylene/propylene copolymer, ethylene/α-olefin copolymer, ethylene/propylene/diene copolymer and polybutadiene. In the present invention, of these, it is preferred to use polybutadiene. Rubbery polymers containing unit derived from butadiene as an essential component such as butadiene/styrene copolymer, butadiene/acrylonitrile copolymer and butadiene/alkyl acrylate copolymer are preferably used in the invention as well as polybutaidene.

The vinyl compound for the vinyl (co) polymer component (B-2) are, for example, vinyl aromatic compounds such as styrene, α-methylstyrene, p-methylstyrene, m-methylstyrene, o-methylstyrene, ring-halogenated styrene, α-vinylnaphthalene and β-vinyl naphthalene; vinyl cyanide compounds such as acrylonitrile and methacrylonitrile; acrylic acid or methacrylic acid alkyl ester compounds having a $C_{1-10}$ alkyl group such as methyl (meth)acrylate, ethyl (meth)acrylate, propyl (meth)acrylate, isopropyl (meth)acrylate, butyl(meth)acrylate, hexyl(meth)acrylate, octyl(meth)acrylate and decyl (meth)acrylate; (meth)acrylic acid hydroxyalkyl ester compounds such as 2-hydroxyethyl methacrylate, hydroxypropylmethacrylate, polyethylene glycol monomethacrylate and polypropylene glycol monomethacrylate. The vinyl (co)polymer (B-2) in the invention is a homopolymer of the above vinyl compound or a copolymer of two or more thereof.

The graft copolymer [B] of the present invention is composed of the olefin polymer part (B-1) as a backbone polymer, and the vinyl (co) polymer part (B-2) as a graft chain, and can be prepared by (co)polymerization of the vinyl compound of the vinyl (co)polymer part (B-2) in the presence of the olefin polymer (B-1) using conventionally known polymerization methods such as emulsion polymerization, block polymerization, solution polymerization and suspension polymerization.

Particularly, the graft copolymer [B] used in the invention is preferably a graft copolymer obtainable by graft copolymerization of at least one monomer selected from vinyl aromatic compounds, vinyl cyanide compounds and (meth) acrylate compounds in the presence of a butadiene-containing rubber.

A suitable example of the graft copolymer [B] may include an ABS resin. The ABS resin is a graft copolymer obtainable by copolymerization of acrylonitrile and styrene in the presence of a butadiene rubbery polymer such as polybutadiene, acrylonitrile-butadiene copolymer (NBR) and styrene/butadiene copolymer (SBR) with the above methods.

The graft copolymer [B] as described above is used in an amount of 0.1 to 20 parts by weight, preferably 0.2 to 15 parts by weight, more preferably 0.5 to 10 parts by weight based on 100 parts by weight of the thermoplastic resin [A].

Blending the graft copolymer [B] with the thermoplastic resin [A] in the above amounts, leads the liquid ethylene/α-olefin random copolymer [C] described later to be dispersed homogeneously in the resin [A] without occurrence of phase separation, thereby a resin composition having the following excellent properties is prepared. When the resin composition is molded into molded articles, the molded article surface has no wetting nor inferior appearance such as peeling. In molding, the resin composition has no mold contamination because the mold releasability thereof is improved, and has excellent mold processability and, further, lowering of the impact strength thereof is depressed.

Liquid Ethylene/α-Olefin Random Copolymer [C]

The liquid ethylene/α-olefin random copolymer [C] used in the resin composition of the present invention (hereinafter referred to as the liquid copolymer [C]) is described.

The liquid copolymer [C] used in the resin composition of the invention is a copolymer comprising ethylene and an α-olefin of 3 to 20 carbon atoms, and is in a liquid state at ordinary temperature (25° C.).

Of all structural units of the liquid copolymer [C], a structural unit derived from ethylene (hereinafter referred to as merely ethylene unit) is in an amount of from 20 to 80 mol %, preferably 30 to 70 mol %, more preferably 40 to 60 mol %, and a structural unit derived from a-olefins (hereinafter referred to as merely α-olefin unit) is in an amount of from 20 to 80 mol %, preferably 30 to 70 mol %, more preferably 40 to 60 mol %.

Examples of α-olefins may include α-olefins having 3 to 20 carbon atoms such as propylene, butene-1, pentene-1, 4-methylpentene-1, hexene-1, heptene-1, octene-1, nonene-1, decene-1, undecene-1, dodecene-1, tridecene-1, tetradecene-1, hexadecene-1, heptadecene-1, octadecene-1, nonadecene-1 or eicosene-1. Among them, propylene is most suitable from the viewpoint of productivity.

The liquid copolymer [C] can be prepared by the method described in JP-B-2-1163/1990 filed by the present applicant. Specifically, ethylene and an a-olefin are continuously copolymerized in the presence of hydrogen in a liquid phase using a catalyst formed from an organoaluminum compound and a soluble vanadium compound of the formula $VO(OR)_n X_{3-n}$ or $VX_4$ (R represents an aliphatic hydrocarbon group, x represents a halogen atom and $1 \leq n \leq 3$), while diluting a polymerization medium so that a vanadium compound concentration in the polymerization system is more than 0.3 mmol per 1 l of the liquid phase and less than 5 times as much as the concentration of the vanadium compound which is fed to the polymerization system.

In addition to the ethylene unit and α-olefin unit, the liquid copolymer [C] may contain a small amount of structural units derived from a non-conjugated diene such as dicyclopentadiene, ethylidene norbornene and 1,6-hexadiene, within not missing the object of the invention. In this case, the total amount of the ethylene unit and the α-olefin unit is preferably from 90 to 100 mol %, specially 95 to 100 mol % based on all of the structural units.

In order to enhance the dispersibility to the thermoplastic resin [A] and the graft copolymer [B], further the liquid copolymer [C] may be the one in which monomers are graft-polymerized such as unsaturated carboxylic acid, their acid anhydrides, their esters, ethylenically unsaturated monomers having a hydroxyl group and styrene hydrocarbon compounds, as described in, for example, JP-A-11-71439/1999. The graft polymerization of these graft monomers can be carried out by known methods of using a radical initiator such as an organic peroxide as described in JP-B-2-1163/1990 and JP-A-5-10588/1993.

The liquid copolymer [C] has a graft-polymerized part in an amount of from preferably 0 to 20% by weight, more preferably 0 to 10% by weight so as not to depart from the object of the present invention.

The liquid copolymer [C] used in the invention has a number average molecular weight (Mn) of from 500 to 10000, preferably 600 to 8000, more preferably 700 to 6000.

The liquid copolymer [C] has a molecular weight distribution (Mw/Mn) of from 1.2 to 3.0, preferably 1.2 to 2.6, more preferably 1.2 to 2.2.

In mixing or molding the resin composition, the liquid copolymer [C] having the number average molecular weight Mn and the molecular weight distribution Mw/Mn in the above ranges does not evaporate with heating, and can give good sliding properties on molded articles.

The liquid copolymer [C] has a pour point of not higher than 20° C., preferably lower than 15° C., more preferably lower than 10° C. The liquid copolymer having the pour point in the above range is in a liquid state showing fluidity at room temperature to have good lubricating properties under the usual use conditions.

When the liquid copolymer [C] having all of the composition, molecular weight, molecular weight distribution and pour point in the above ranges is added to the thermoplastic resin [A], resin compositions having excellent various properties such as sliding properties, wear properties, molding properties and the like can be prepared.

The number average molecular weight Mn and the molecular weight distribution Mw/Mn of the liquid copolymer [C] are determined by measurement using monodispersed polystyrene as a standard substance and tetrahydrofuran (THF) as a solvent with the gel permeation chromatography method (GPC), and so the values of Mn and Mw/Mn are determined in terms of polystyrene.

The liquid ethylene/α-olefin random copolymer [C] is used in an amount of from 0.1 to 10 parts by weight, preferably 0.2 to 8 parts by weight, more preferably 0.5 to 5 parts by weight based on 100 parts by weight of the thermoplastic resin [A].

Preparation of Resin Composition

The resin composition of the present invention is prepared by mixing the thermoplastic resin [A], the graft copolymer [B] and the liquid ethylene/α-olefin random copolymer [C]. Exemplary mixing processes may include, which in no way limit the scope of the invention, any conventionally known mixing processes.

For example, the thermoplastic resin [A] is molten and then kneaded with the graft copolymer [B] and the liquid ethylene/α-olefin random copolymer [C] to attain uniformly dispersing and mixing. It is possible, as a kneading device, to use any of single-screw extruder, twin-screw extruder, kneader and Plasto mill. The kneading temperature, kneading time and other conditions are appropriately selected depending on the kinds of the resin [A], the graft copolymer [B] and the liquid ethylene/α-olefin random copolymer [C] used and the mixing proportion thereof.

The resin composition of the present invention comprises the thermoplastic resin [A], the graft copolymer [B] and the liquid ethylene/α-olefin random copolymer [C] in the specific proportion and the liquid ethylene/α-olefin random copolymer [C] is uniformly dispersed in the thermoplastic resin [A]. Therefore, the resin composition has excellent sliding properties, wear-resistant properties and mold processability without occurrences of deterioration in appearance such as surface wetting, peeling and the like and mold contamination.

The resin composition of the present invention can lead molded articles with various molding processes. Molding of using the resin composition of the present invention has low mold contamination at the molding time, so that it can prepare molded articles having excellent appearance without the occurrence of surface peeling of the molded articles.

Further, the resulting molded articles have excellent sliding properties, wear resistant properties and impact resistance. Accordingly, the resin compositions of the present invention are used to applications required to have sliding properties and wear resistant properties, for example, materials of gears, axes of rotation, bearings and switch parts, and further can be used for applications no required to have the above properties.

Molding processes generally and widely employed for thermoplastic resins, such as extrusion molding, injection molding, vacuum forming, blow molding, compression molding, transfer molding and casting molding processes may be employable as the molding process.

The resin composition for molding can be mixed with additives such as heat resistant stabilizers, weathering stabilizers, flame retardants, antistats, nucleating agents, colorants, foaming agents, fillers and reinforcing agents within the object of the invention.

EFFECT OF THE INVENTION

The molding resin composition of the invention comprises the thermoplastic resin [A] and the liquid ethylene/α-olefin random copolymer [C], and further, the graft copolymer [B] in a specific amount. Therefore, in the resin composition, the thermoplastic resin [A] and the liquid ethylene/α-olefin random copolymer [C] disperse uniformly without phase separation. Thereby such resin compositions have excellent molding processability, that is, there are neither deterioration in appearance such as surface wetting and peeling of molded articles, nor mold contamination when formed into molded articles, because of having improved mold-releasability in molding.

Furthermore, the use of the resin compositions can prepare molded articles having excellent sliding properties, wear resistant properties and impact resistance.

EXAMPLES

The present invention will be further illustrated below with reference to the following Examples, which in no way limit the scope of the invention.

In Examples and Comparative examples, the following components were used.

(1) Thermoplastic Resin [A]

As the thermoplastic resins, a polyacetal resin (POM) [Duracon M 90™ available from Polyplastics Co.] and a polybutylene terephthalate resin (PBT) [Duranex 2002™ available from Polyplastics Co.] were used.

(2) Graft Copolymer [B]

As the graft copolymer, ABS (polybutadiene rubber-acryl nitrile/styrene copolymer comprising 60% by weight of polybutadiene rubber and 10% by weight of acrylnitrile was used]).

(3) Ethylene/α-Olefin Copolymer

The liquid ethylene/α-olefin copolymers shown in Table 1 were used.

TABLE 1

| Ethylene/ propylene copolymer | Amount of ethylene structural unit (mol %) | Amount of propylene structural unit (mol %) | Number average molecular weight (Mn) | Molecular weight distribution (Mw/Mn) | Pour point (° C.) |
|---|---|---|---|---|---|
| EP1 | 50 | 50 | 1340 | 1.39 | −50 |
| EP2 | 55 | 45 | 7730 | 1.86 | −5 |
| EP3 | 70 | 30 | 9890 | 1.82 | 15 |
| EP4 | 70 | 30 | 44920 | 1.71 | Higher than 25° C. |

EP1 to EP3 were in liquid states at ordinary temperature, and EP4 was in a solid state not liquid state at ordinary temperature.

Examples 1 to 5

In each example, using a twin screw extruder TEM-35B (manufactured by Nippon Seikosho Co.), components in the proportions shown in Table 2 each were molten and mixed, and the resulting polyacetal resin composition was injection-molded into a 200 mm×200 mm×3 mm sheet by means of an injection molding machine M-100A II-DM (manufactured by Meiki Seisakusho Co.).

With regard to the resulting sheet, (1) mold contamination in molding, (2) appearance of the resulting molded article, (3) a dispersed condition in the resin composition and (4) frictional properties of the molded article were evaluated with the following methods.

[Evaluation Methods]

(1) Evaluation on Mold Contamination

After the molding with the injection molding machine, when the molding was performed without the occurrence of contamination caused by remaining resins on the mold surface, it was evaluated as "AA", when with the occurrence of partial contamination, it was evaluated as "BB", and when with the occurrence of terrible contamination as a whole, it was evaluated as "CC".

(2) Appearance of Molded Article

When the surface of the sheet molded with the injection molding machine had no roughness and was in a smooth state, it was evaluated as "AA", when it had partial peeling or droplet scattering, it was evaluated as "BB", and when it, as a whole, has peeling and terrible droplet scattering, it was evaluated as "CC".

(3) Dispersed Condition

The surface of the resulting molded article was chipped out of and observation thereof was conducted with a transmission electron microscope (TEM) to measure dispersed particle diameters of the liquid ethylene/α-olefin copolymer.

(4) Frictional Properties (Friction and Wear Properties)

Coefficient of dynamic friction between SUS and the resin and abrasion loss were evaluated in the following conditions in accordance with the process determined in JIS K7218.

Material for matching: Carbon steel for mechanical structure S45C (JIS G 4051)

Load: 15 Kg/cm$^2$

Sliding rate: 0.2 m/s

Testing time: 60 min (5) Impact Resistance

Apart from the molded sheet used in the above tests (1) to (4), a notched test piece defined in ASTM was molded and Izod impact strength thereof at 23° C. was measured in accordance with ASTM D256 method.

The results are shown in Table 2.

Comparative Example 1

A molded article was prepared using the polyacetal resin singly without the addition of the graft copolymer and the liquid ethylene/α-olefin copolymer, and was evaluated in the same methods as in Example 1.

The results are shown in Table 2.

Comparative Example 2

The mixing procedure of Example 1 was repeated except that the liquid ethylene/α-olefin random copolymer was not used, to prepare a polyacetal resin composition, and the resulting composition was molded and evaluated.

The results are shown in Table 2.

Comparative Examples 3 and 4

The mixing procedure of each of Examples 1 and 4 was repeated except that the ABS resin was not used, to prepare a polyacetal resin composition, and the resulting composition was molded and evaluated.

The results are shown in Table 2.

Comparative Example 5

The mixing procedure of Example 1 was repeated except that an ethylene/propylene copolymer (EP4) in a solid state at room temperature was used in place of the liquid ethylene/α-olefin copolymer, to prepare a polyacetal resin composition, and the resulting composition was molded and evaluated.

The results are shown in Table 2.

TABLE 2-1

|  | Ex. 1 | Ex. 2 | Ex.3 | Ex. 4 | Ex. 5 |
|---|---|---|---|---|---|
| Resin composition |  |  |  |  |  |
| [A] Polyacetal resin | 100 | 100 | 100 | 100 | 100 |
| [B] Graft copolymer | 5 | 5 | 10 | 5 | 5 |
| [C] Ethylene/ EP1 | 3 | 5 | 3 |  |  |
| α-olefin EP2 |  |  |  | 3 |  |
| copolymer EP3 |  |  |  |  | 3 |
| EP4 |  |  |  |  |  |
| Evaluation result |  |  |  |  |  |
| Mold contamination | AA | AA | AA | AA | AA |
| Molded article appearance | AA | AA | AA | AA | AA |
| Dispersed particle diameter (μm) | 0.4–1.0 | 0.2–2.0 | 0.2–1.0 | 0.2–2.0 | 0.4–2.0 |
| Coefficient of Dynamic friction | 0.1597 | 0.1721 | 0.1983 | 0.1594 | 0.1501 |
| Abrasion loss (mg) | 27.4 | 17.0 | 15.6 | 16.1 | 15.7 |
| Izod impact strength )J/m) | 115 | 108 | 118 | 100 | 104 |

TABLE 2-2

|  | Com. Ex. 1 | Com. Ex. 2 | Com. Ex.3 | Com. Ex. 4 | Com. Ex. 5 |
|---|---|---|---|---|---|
| Resin composition |  |  |  |  |  |
| [A] Polyacetal resin | 100 | 100 | 100 | 100 | 100 |
| [B] Graft copolymer |  | 5 |  |  | 5 |
| [C] Ethylene/ EP1 |  |  | 3 |  |  |
| α-olefin EP2 |  |  |  | 3 |  |
| copolymer EP3 |  |  |  |  |  |
| EP4 |  |  |  |  | 3 |
| Evaluation result |  |  |  |  |  |
| Mold contamination | AA | AA | CC | CC | AA |
| Molded article appearance | AA | AA | CC | CC | CC |
| Dispersed particle diameter (μm) | – *1 | – *1 | 0.3–4.0 | 0.3–4.0 | 0.3–4.0 |
| Coefficient of Dynamic friction | 0.3174 | 0.3237 | *2 Measurement was unfeasible. | 0.1559 | 0.1602 |
| Abrasion loss (mg) | 129.8 | 72.7 |  | 64.8 | 74.0 |
| Izod impact strength )J/m) | 120 | 110 | 79 | 81 | 100 |

*1: The component [C] was not added, so that there were no data.
*2: The surface of the molded article had much roughness so that measurement could not conducted.

As clear from Table 2, especially from Examples 1 to 5, a good dispersion condition of the liquid ethylene-α-olefin copolymer in he resin can be obtained by blending the polyacetal resin, ABS resin, liquid ethylene-α-olefin random copolymer in the specific proportions, and thereby molded articles having excellent molding properties and appearance, also low coefficient of friction and low abrasion loss and excellent sliding properties can be obtained.

The case that ABS resin is not contained (Comparative Examples 3 and 4) shows that the molding properties and appearance are decreased and the impact strength is lowered markedly. On the other hand, the case that ABS resin is contained, shows that the lowering of impact strength is depressed. The case that the specific liquid ethylene/α-olefin random copolymer is not contained (Comparative Examples 2 and 5) results in decreasing the sliding properties, that is, high coefficient of friction or high abrasion loss.

Examples 6 to 10

The mixing procedure of Example 1 was repeated except that polybutylene terephthalate was used in place of the polyacetal resin and the blending was as shown in Table 3, to prepare a polybutylene terephthalate resin composition, and the resulting composition was molded and evaluated in the same methods as shown in Example 1.

The results are shown in Table 3.

Comparative Example 6

A molded article was prepared using the polybutylene terephthalate resin singly without the addition of the graft copolymer and the liquid ethylene/α-olefin copolymer, and was evaluated in the same methods as in Example 6.

The results are shown in Table 3.

Comparative Example 7

The mixing procedure of Example 6 was repeated except that the liquid ethylene/α-olefin random copolymer was not used, to prepare a resin composition, and the resulting polybutylene terephthalate composition was molded to prepare a molded article and it was evaluated in the same methods as in Example 1.

The results are shown in Table 3.

Comparative Examples 8 and 9

The mixing procedure of each of Examples 6 and 9 was repeated except that the ABS resin was not used, to prepare a resin composition, and the resulting polybutylene terephthalate resin composition was molded to prepare a molded article and it was evaluated in the same methods as in Example 1.

The results are shown in Table 3.

Comparative Example 10

The procedure of Example 6 was repeated except that a solid ethylene/propylene copolymer (EP4) having no fluidity at room temperature was used in place of the liquid ethylene/α-olefin random copolymer, to prepare a resin composition, and the resulting polybutylene terephthalate resin composition was molded to prepare a molded article and it was evaluated in the same methods as in Example 1.

The results are shown in Table 3.

TABLE 3-1

|  | Ex. 6 | Ex. 7 | Ex. 8 | Ex. 9 | Ex. 10 |
|---|---|---|---|---|---|
| Resin composition |  |  |  |  |  |
| [A] Polybutylene terephthalate resin | 100 | 100 | 100 | 100 | 100 |
| [B] Graft copolymer (ABS) | 5 | 5 | 10 | 5 | 5 |
| [C] Ethylene/ EP1 | 3 | 5 | 3 |  |  |
| α-olefin EP2 |  |  |  | 3 |  |
| copolymer EP3 |  |  |  |  | 3 |
| EP4 |  |  |  |  |  |
| Evaluation result |  |  |  |  |  |
| Mold contamination | AA | AA | AA | AA | AA |
| Molded article appearance | AA | AA | AA | AA | AA |
| Dispersed particle diameter (μm) | 0.2–1.0 | 0.2–2.0 | 0.2–1.0 | 0.2–3.0 | 0.2–3.5 |

TABLE 3-1-continued

|  | Ex. 6 | Ex. 7 | Ex. 8 | Ex. 9 | Ex. 10 |
|---|---|---|---|---|---|
| Coefficient of Dynamic friction | 0.1442 | 0.1367 | 0.1991 | 0.1945 | 0.2012 |
| Abrasion loss (mg) | 2.6 | 2.4 | 2.0 | 2.8 | 3.2 |
| Izod impact strength (J/m) | 76 | 68 | 81 | 65 | 64 |

TABLE 3-2

| | | Com. Ex. 6 | Com. Ex. 7 | Com. Ex. 8 | Com. Ex. 9 | Com. Ex. 10 |
|---|---|---|---|---|---|---|
| Resin composition | | | | | | |
| [A] Polybutylene terephthalate resin | | 100 | 100 | 100 | 100 | 100 |
| [B] Graft copolymer (ABS) | | | 5 | | | 5 |
| [C] Ethylene/ α-olefin copolymer | EP1 | | | 3 | | |
| | EP2 | | | | 3 | |
| | EP3 | | | | | |
| | EP4 | | | | | 3 |
| Evaluation result | | | | | | |
| Mold contamination | | AA | AA | BB | BB | AA |
| Molded article appearance | | AA | AA | CC | CC | AA |
| Dispersed particle diameter (μm) | | – *1 | – *1 | 0.2–5.0 | 0.4–7.0 | 1.0–10 |
| Coefficient of Dynamic friction | | 0.3102 | 0.3355 | 0.1074 | 0.1390 | 0.2971 |
| Abrasion loss (mg) | | 22.4 | 12.5 | 1.4 | 2.1 | 10.3 |
| Izod impact strength (J/m) | | 48 | 63 | 42 | 45 | 60 |

*1: The component [C] was not added, so that there were no data.

As clear from Table 3, especially from Examples 6 to 10, a good dispersion condition of the liquid ethylene-α-olefin copolymer in the resin can be obtained by blending the polyacetal resin, polybutylene terephthalate resin, liquid ethylene-α-olefin random copolymer in the specific proportions, and thereby molded articles having excellent molding properties and appearance, also low coefficient of friction and low abrasion loss and excellent sliding properties can be obtained.

The case that ABS resin is not contained (Comparative Examples 8 and 9) results in causing problems in molding properties and appearance, and lowering impact strength. The case that the specific liquid ethylene/α-olefin random copolymer is not contained (Comparative Examples 7 and 10) results in decreasing the sliding properties.

What is claimed is:

1. A thermoplastic resin composition, which is a copolymer comprising:

[A] 100 parts by weight of a polyacetal resin or thermoplastic aromatic polyester resin,

[B] 0.1 to 20 parts by weight of a graft polymer in which (B-2) a vinyl (co)polymer component comprising at least one vinyl compound is graft-polymerized on (B-1) an olefin polymer as a backbone polymer, and

[C] 0.1 to 10 parts by weight of a non-grafted liquid ethylene/α-olefin random copolymer consisting of ethylene, an α-olefin having 3 to 20 carbon atoms, and optionally a non-conjugated diene, said copolymer formed by a process consisting of copolymerization of said ethylene, α-olefin and optionally said non-conjugate diene components, which random copolymer has:

(i) a proportion of a structural unit derived from ethylene of from 20 to 80 mol % and a proportion of a structural unit derived from α-olefin of from 20 to 80 mol % based on all structural units, with said structural units of ethylene and α-olefin being present in a total amount ranging from 90 to 100 mol %, (ii) a number average molecular weight (Mn) of from 500 to 10000, (iii) a molecular weight distribution (Mw/Mn) determined by a ratio of a weight average molecular weight (Mw) to a number average molecular weight (Mn) of from 1.2 to 3, and (iv) a pour point of lower than 20° C.

2. The thermoplastic resin composition according to claim 1, wherein the graft copolymer [B] is a graft copolymer obtainable by graft copolymerization of at least one monomer selected from the group consisting of vinyl aromatic compounds, vinyl cyanide compounds and (meth)acrylic ester compounds, in the presence of a butadiene-containing rubber.

3. The thermoplastic resin composition according to claim 1 or 2 wherein the graft copolymer [B] is an ABS resin.

4. The thermoplastic resin composition according to claim 1 or 2 wherein the thermoplastic aromatic polyester resin component [A] is polybutylene terephthalate.

5. The thermoplastic resin composition according to claim 1 or 2 wherein the liquid ethylene/α-olefin random copolymer component [C] as a liquid ethylene/propylene copolymer.

6. The thermoplastic resin composition according to claim 3 wherein the thermoplastic aromatic polyester resin component [A] is polybutylene terephthalate.

7. The thermoplastic resin composition according to claim 3 wherein the liquid ethylene/α-olefin random copolymer component [C] is a liquid ethylene/propylene copolymer.

8. The thermoplastic resin composition according to claim 4 wherein the liquid ethylene/α-olefin random copolymer component [C] is a liquid ethylene/propylene copolymer.

* * * * *